(12) United States Patent
Kuo et al.

(10) Patent No.: US 7,619,190 B2
(45) Date of Patent: Nov. 17, 2009

(54) TILTING ADJUSTABLE SURFACE PROFILOMETER

(75) Inventors: Shih-Hsuan Kuo, Hsinchu County (TW); Jin-Liang Chen, Hsinchu (TW); Ching-Ming Yeh, Hsinchu (TW); Shih-Fang Lee, Hsinchu (TW); Hung-Ming Tai, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 12/058,891

(22) Filed: Mar. 31, 2008

(65) Prior Publication Data
US 2009/0079995 A1 Mar. 26, 2009

(30) Foreign Application Priority Data
Sep. 21, 2007 (TW) .............................. 96135266 A

(51) Int. Cl.
*G02B 7/04* (2006.01)
*G02B 27/40* (2006.01)
*G02B 27/64* (2006.01)

(52) U.S. Cl. ....................... 250/201.3; 382/128; 356/39

(58) Field of Classification Search .............. 250/201.3; 382/128–133; 356/39, 501
See application file for complete search history.

(56) References Cited

U.S. PATENT DOCUMENTS

| 5,204,734 A * | 4/1993 | Cohen et al. ................. 356/497 |
| 6,449,048 B1 | 9/2002 | Olszak |
| 7,330,574 B2 * | 2/2008 | Olszak ....................... 382/128 |

FOREIGN PATENT DOCUMENTS
TW           I229186           3/2005

* cited by examiner

*Primary Examiner*—Seung C Sohn
(74) *Attorney, Agent, or Firm*—WPAT, PC; Justin King

(57) ABSTRACT

The invention relates to a tilting adjustable surface profilometer, comprising an apparatus capable of adjusting an image acquiring angle. The apparatus includes two types of frameworks. One is a translation-stage-type tilting adjustable surface profilometer, which is enabled by the translations of two translation stage with the rotation of a rotary rack, a surface profile with an omni-directional angle of a sample can be obtained. The other framework is a surface profilometer with an arc-trajectory tilting apparatus, which is enabled by guiding the surface profilometer to slide along the arc rails with the rotations of the rotary rack, a surface profile with an omni-directional angle of a sample can be obtained.

14 Claims, 17 Drawing Sheets

TILTING ADJUSTABLE SURFACE PROFILOMETER

BACKGROUND OF THE INVENTION

1. Field of the Invention

The present invention generally relates to a surface profilometer and, more particularly, to a tilting adjustable surface profilometer capable of obtaining a surface profile with an omni-directional angle of a sample.

2. Description of the Prior Art

High-precision surface profilometry is a key technique in the modern world. With the downsizing of the components, precise and reliable detection skills on surface profilometry are required to verify the size of microstructures and precision of surface profiles to certificate the manufacture quality.

Optical non-contact detection is widely used in various industries such as brightness enhancement films (BEF's) for liquid-crystal display (LCD's) to acquire the precise surface profile of a sample without any damage to the sample. The BEF's are detected using a surface profilometer to verify whether the surface microstructure meets all the requirements for the LCD's using the BEF's to exhibit enough brightness.

Please refer to FIG. 1, which is a schematic diagram wherein the reflected light cannot return back to the optical microscope. As the surface gradient of the sample is large, especially when co-axial light is used to pass through the optical microscope 11, the reflected light 13 from the sample 12 can not return to the optical microscope 11. Therefore, it is impossible to obtain the surface profile of the sample. Under such circumstances, interpolation is used. However, the acquired result is far from satisfactory compared to the actual surface profile.

In the literature, there are some reports and patents presented to overcome the afore-mentioned problems. However, they are not suitable for measuring the micro-structured surface profile of a large sample.

Please refer to FIG. 2, which is a structural diagram of a conventional 3-D surface profilometer. In the surface profilometer 21, the sample 23 is fixedly disposed perpendicular to the optic axis 22 so that reflected light from the sample 23 cannot be collected when the surface gradient is large, as shown in FIG. 3. Meanwhile, image interpolation is required to cause distortion compared to the actual surface profile.

Please refer to FIG. 4, which is a schematic diagram showing a disclosure of TW Patent No. I229186. In FIG. 4, two linear scanning devices 21, 22 with different view angles are used with a tilt light source 23 to roughly detect the size and shape of a sample. It is useful for defect detection on a large area. However, it is not suitable for 3-D surface profilometry. Moreover, when the surface gradient of the sample is large, the reflected surface signal cannot be received.

Please refer to FIG. 5, which is a schematic diagram showing a disclosure of U.S. Pat. No. 6,449,048. In FIG. 5, an interferometer is tilt an angle relative to a sample. A conventional vertical scanning interferometer (VSI) and a phase-shift interferometer (PSI) are used to continuously scan to surface of the sample so as to obtain the surface profile of the sample without image interpolation. However, a surface profile with an omni-directional angle cannot be obtained when the surface gradient of the sample is large.

Please refer to FIG. 6, which shows a disclosure of QED Technology for surface profilometry on a large-area tilt and rotating sample. In FIG. 6, a surface profile of a large-area sample with a large surface gradient is obtained by tilting and rotating the sample. A surface profilometer is used to obtain the surface profile of the large sample with a large surface gradient. Even though this method overcomes the problems resulting from the previous disclosures, it can only be used to detect a small-size sample. If the sample is a roller mold for manufacturing BEF's for LCD's, which is hard to be rotated and tilt, detection thereon cannot be performed.

SUMMARY OF THE INVENTION

It is an object of the present invention to provide a tilting adjustable surface profilometer capable of obtaining a surface profile with an omni-directional angle of a sample.

In one embodiment, the present invention provides a tilting adjustable surface profilometer, comprising:
a rack;
a surface detecting unit, capable of acquiring a surface profile of a sample;
a first tilting adjustment device, being coupled to the rack so that one end of the first tilting adjustment device is coupled to the surface detecting unit; and
a second tilting adjustment device, being coupled to the rack and disposed on one side of the first tilting adjustment device so that one end of the second tilting adjustment device is slidably coupled to the surface detecting unit and the second tilting adjustment device and the first tilting adjustment device are capable of moving relatively to each other to adjust the tilting of the surface detecting unit.

In another embodiment, the present invention provides a tilting adjustable surface profilometer, comprising:
a rack;
a surface detecting unit, capable of acquiring a surface profile of a sample; and
a tilting adjustment device, being coupled to the rack so that the tilting adjustment device is capable of driving the surface detecting unit to move with an arc-trajectory to adjust the tilting of the surface detecting unit.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

Figure 1:
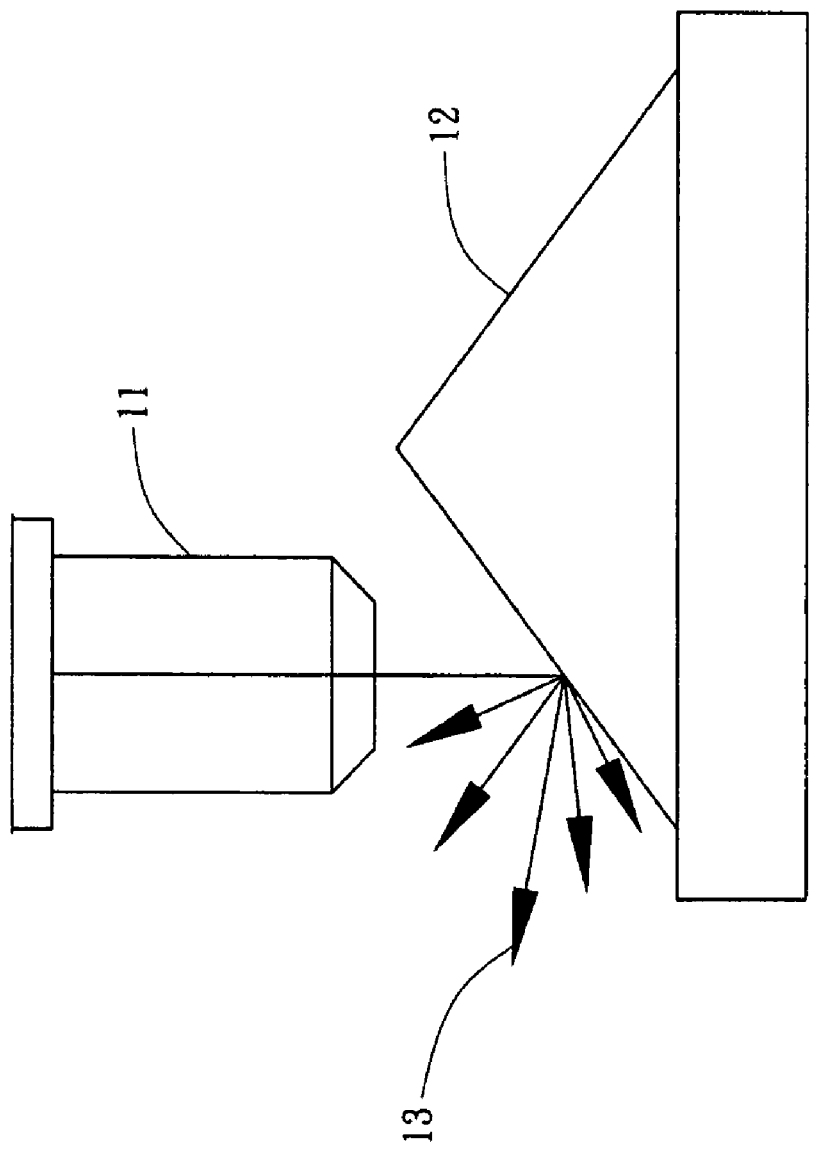
FIG. 1 is a schematic diagram wherein the reflected light cannot return back to the optical microscope.
Figure 2:
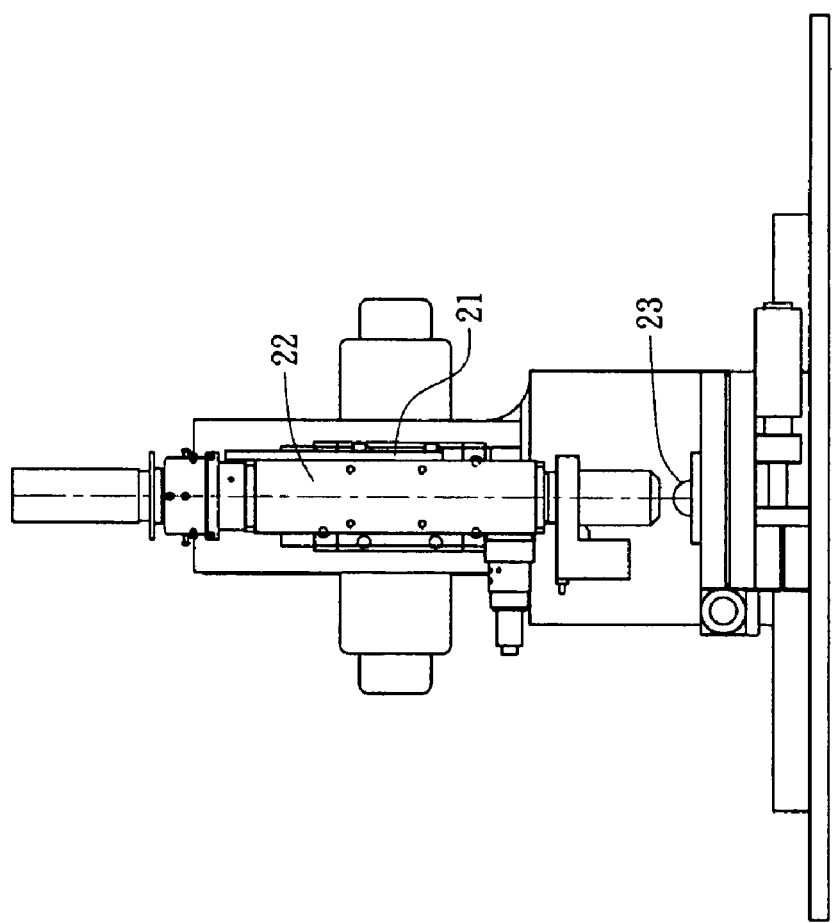
FIG. 2 is a structural diagram of a conventional 3-D surface profilometer.
Figure 3:
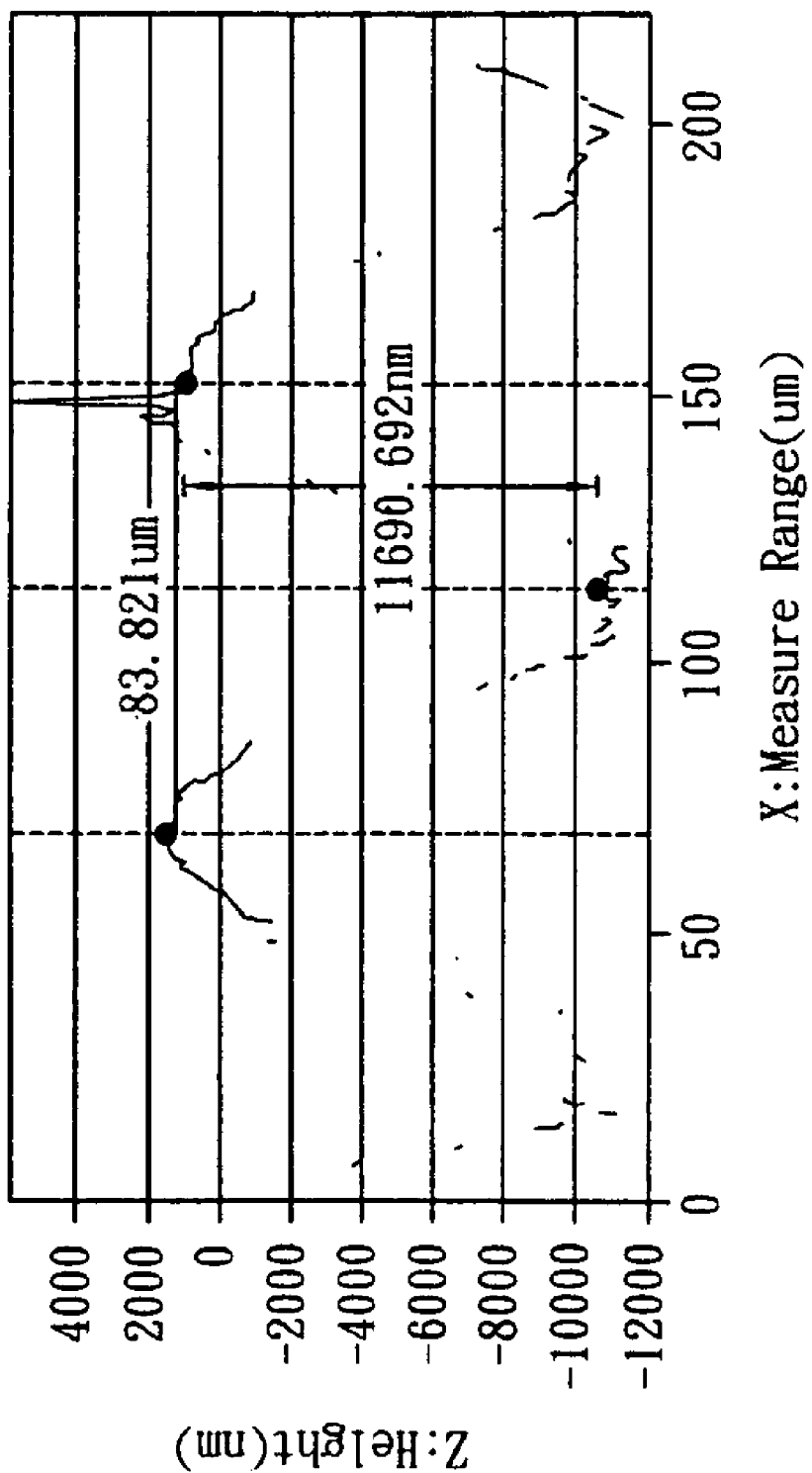
FIG. 3 shows an example wherein the conventional 3-D surface profilometer is used for surface profilometry on a surface with a large surface gradient.
Figure 4:
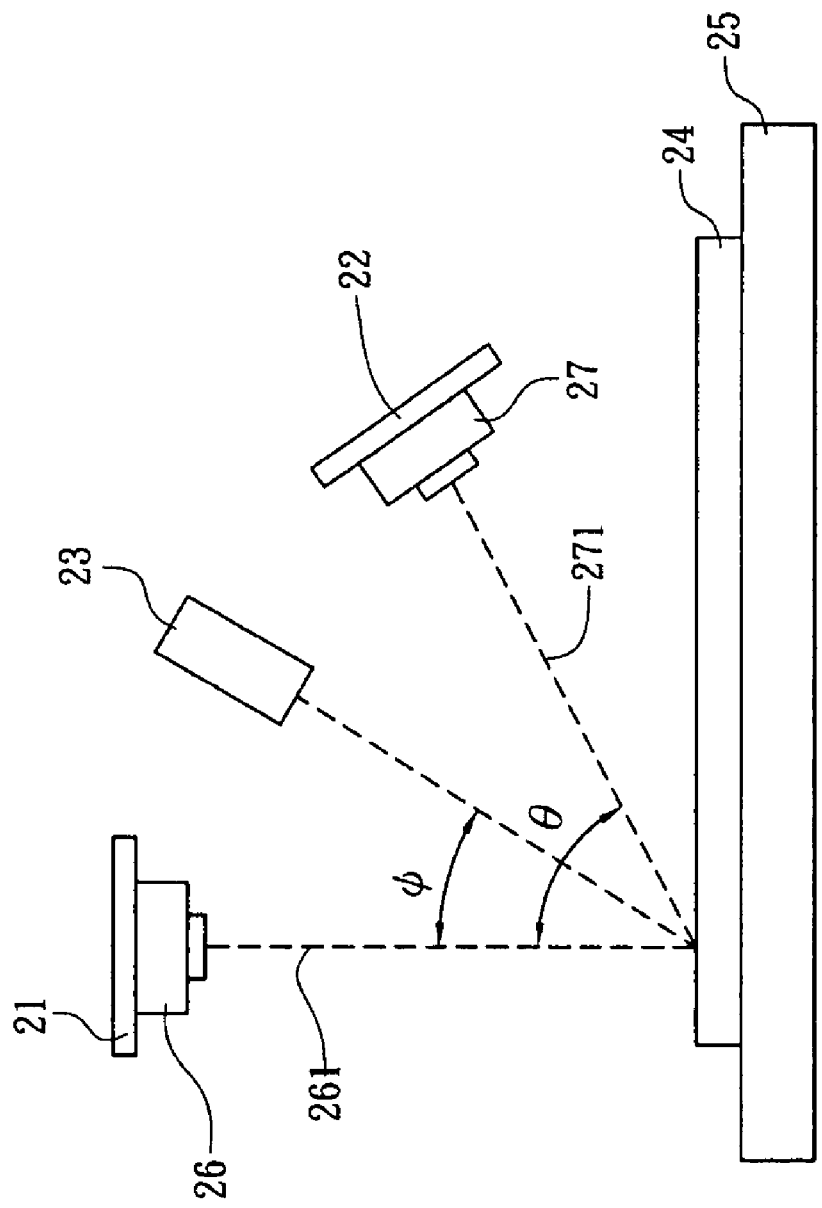
FIG. 4 is a schematic diagram showing a disclosure of TW Patent No. 1,229,186.
Figure 5:
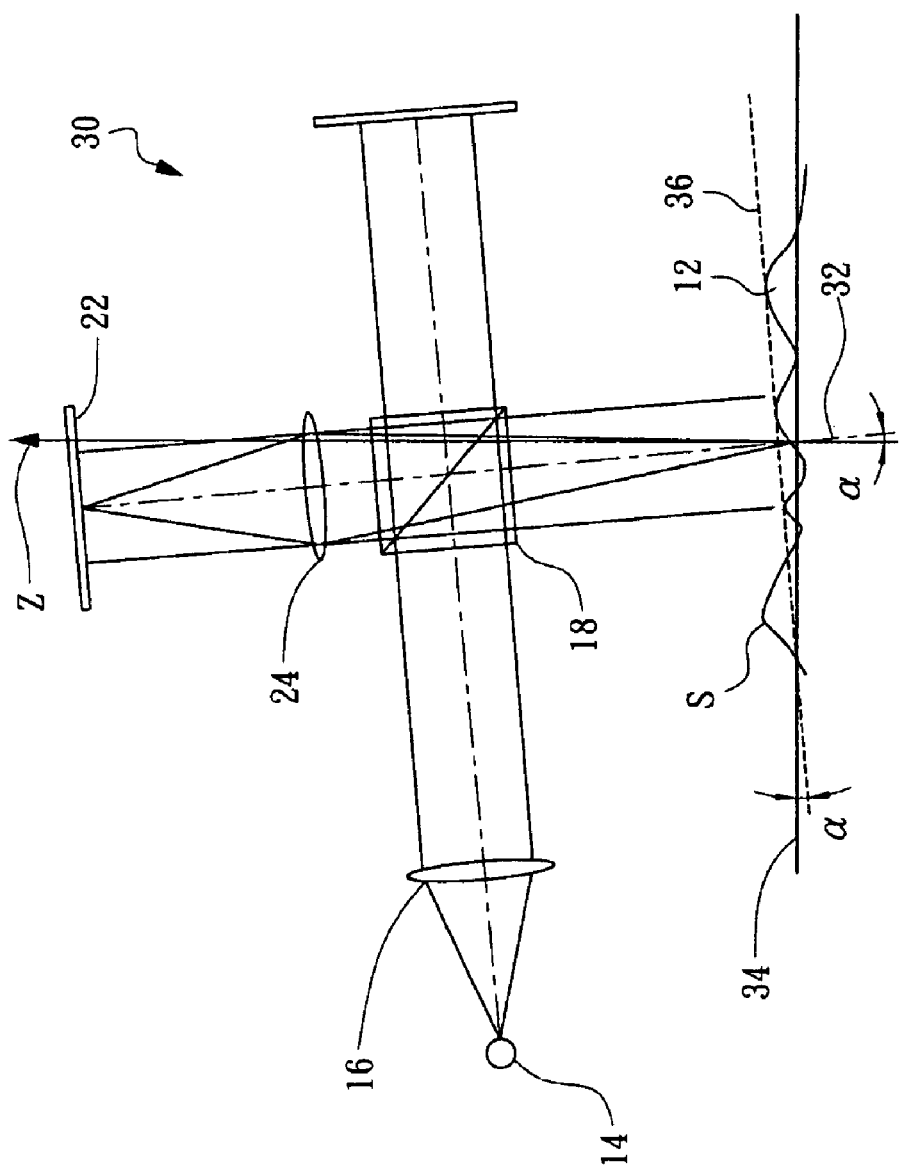
FIG. 5 is a schematic diagram showing a disclosure of U.S. Pat. No. 6,449,048.
Figure 6D:
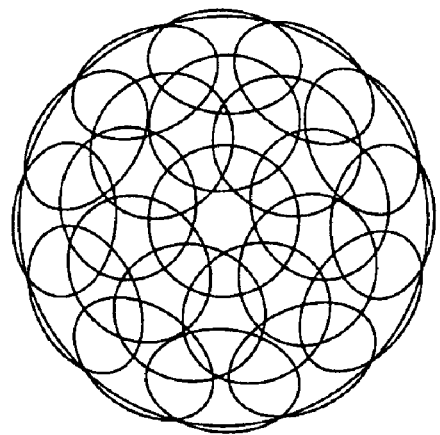
FIG. 6 shows a disclosure of QED Technology for surface profilometry on a large-area tilt and rotating sample.
Figure 6C:
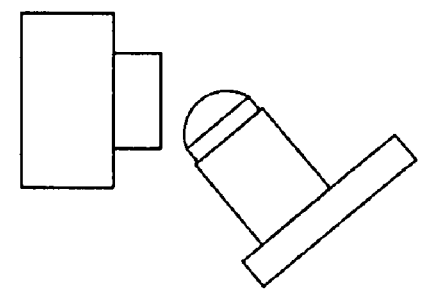
Figure 6B:
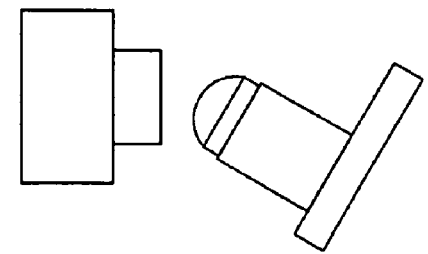
Figure 6A:
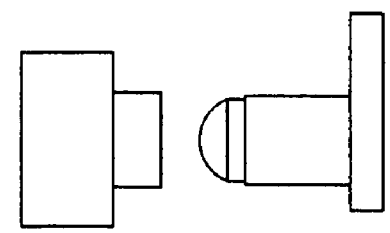
Figure 8:
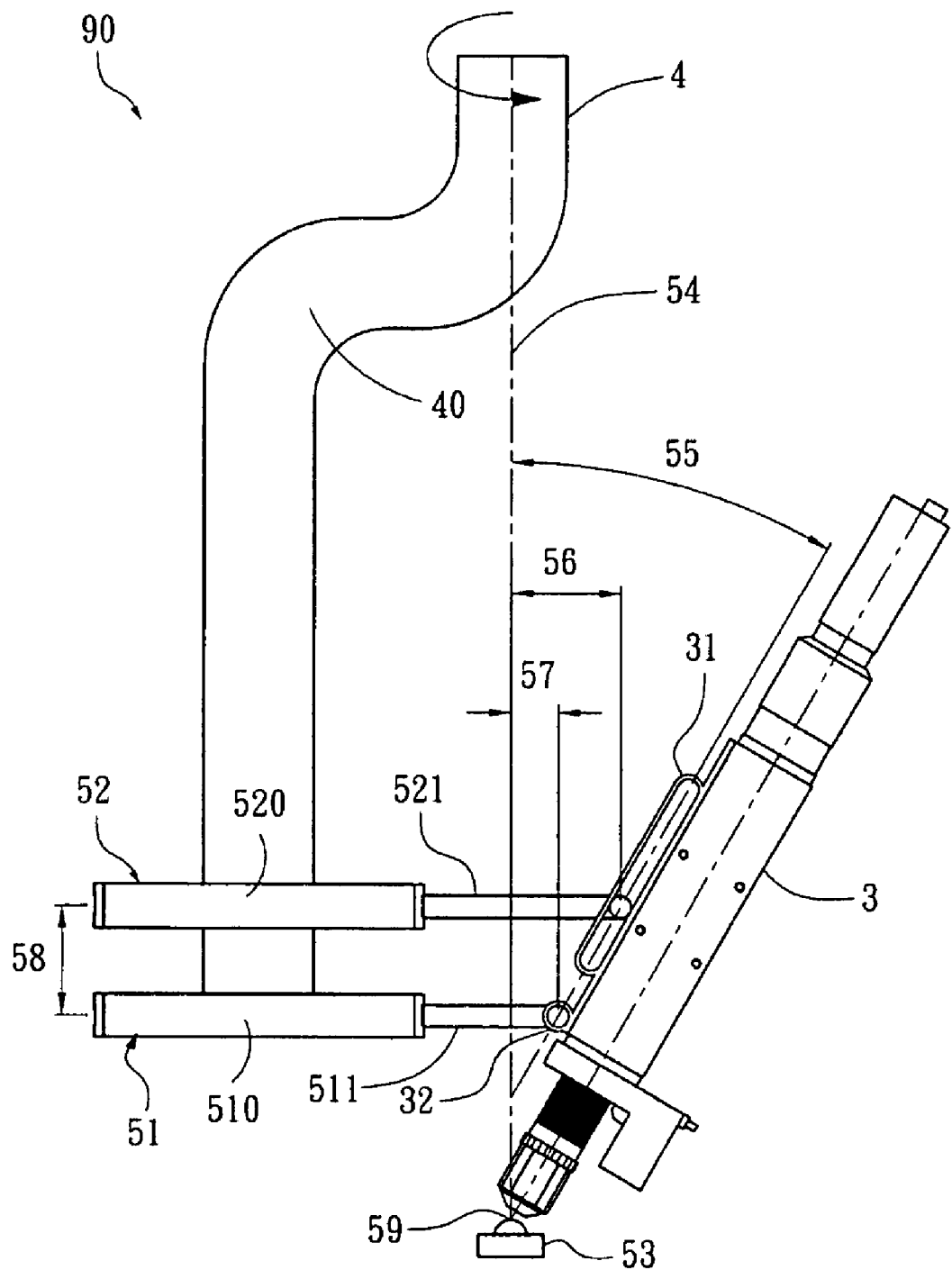
FIG. 8 is a schematic diagram showing a tilting adjustable surface profilometer according to a first embodiment of the present invention.
Figure 9:
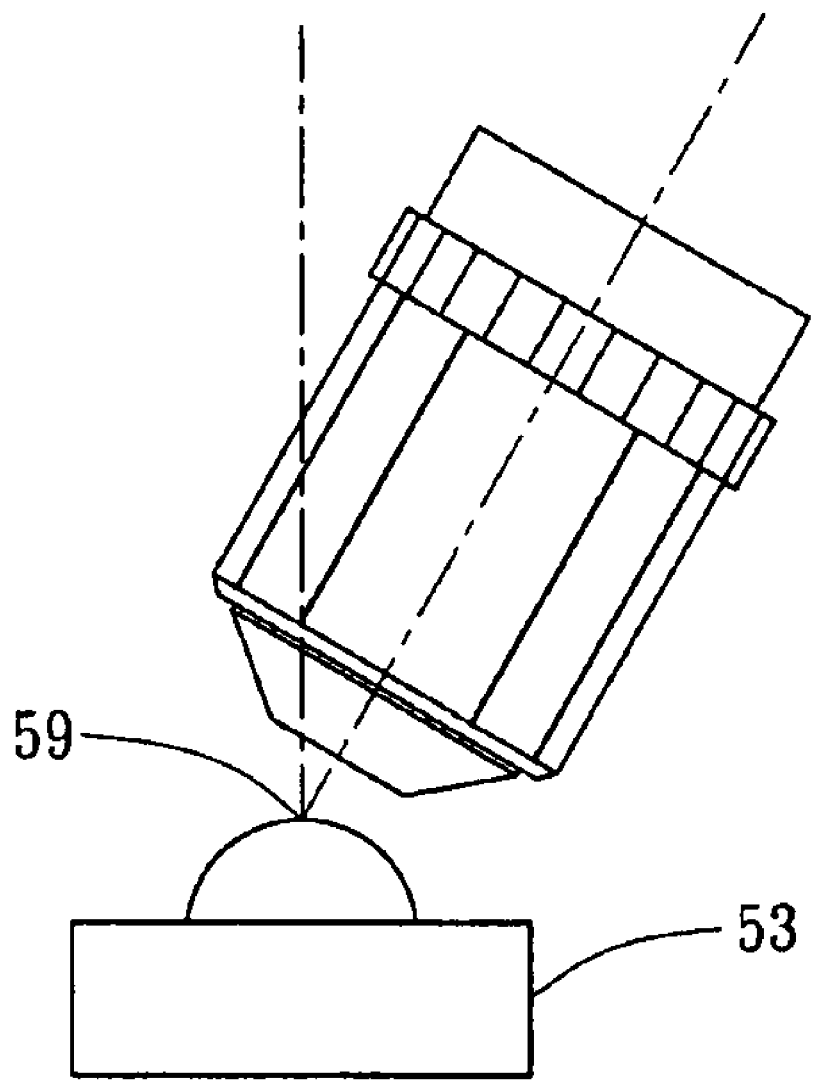
FIG. 9 is a schematic diagram showing the focal point of the surface detecting unit in FIG. 8, which is on the sample surface.
Figure 10:
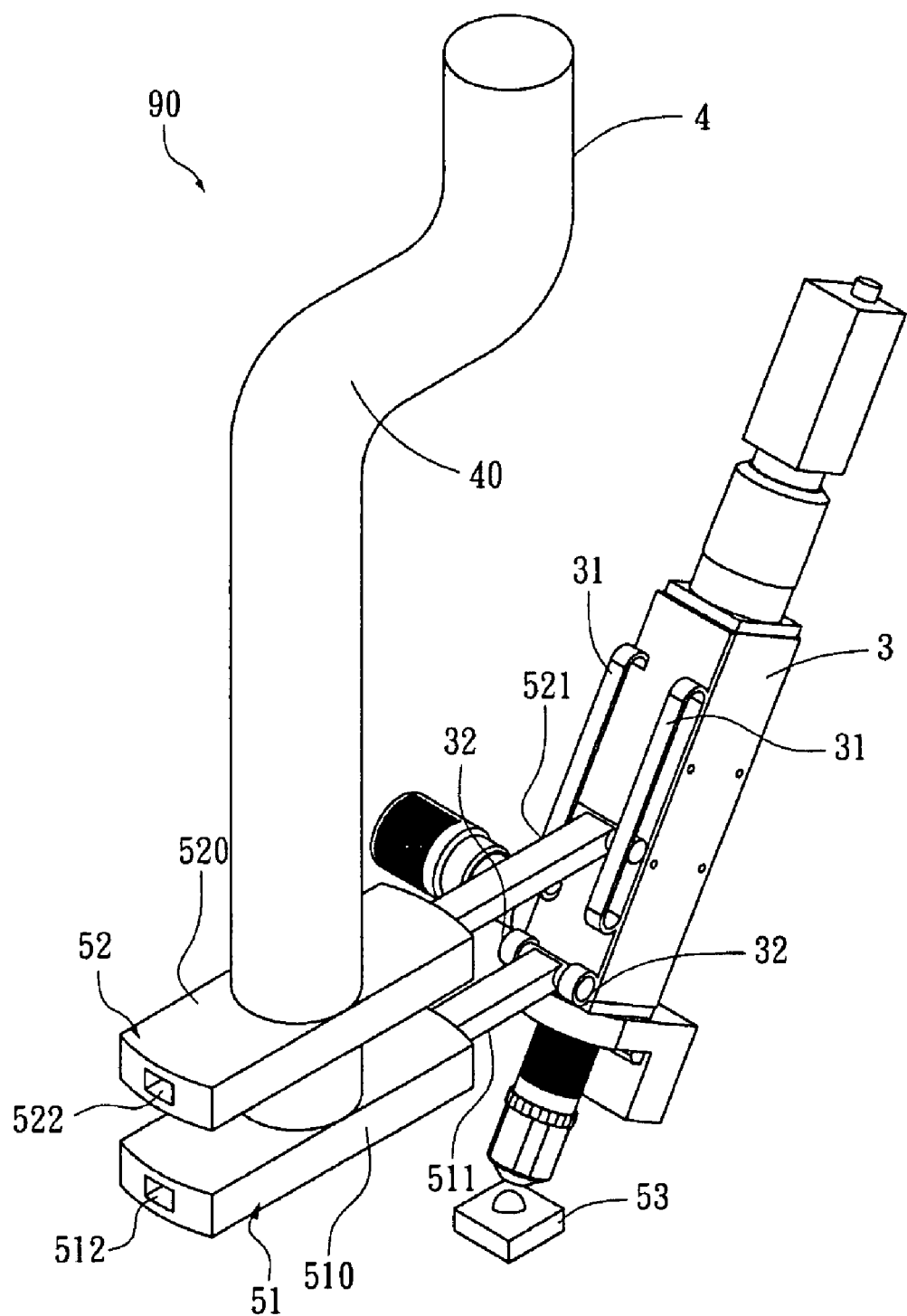
FIG. 10 is a 3-D structural diagram of the tilting adjustable surface profilometer in FIG. 8.
Figure 11:
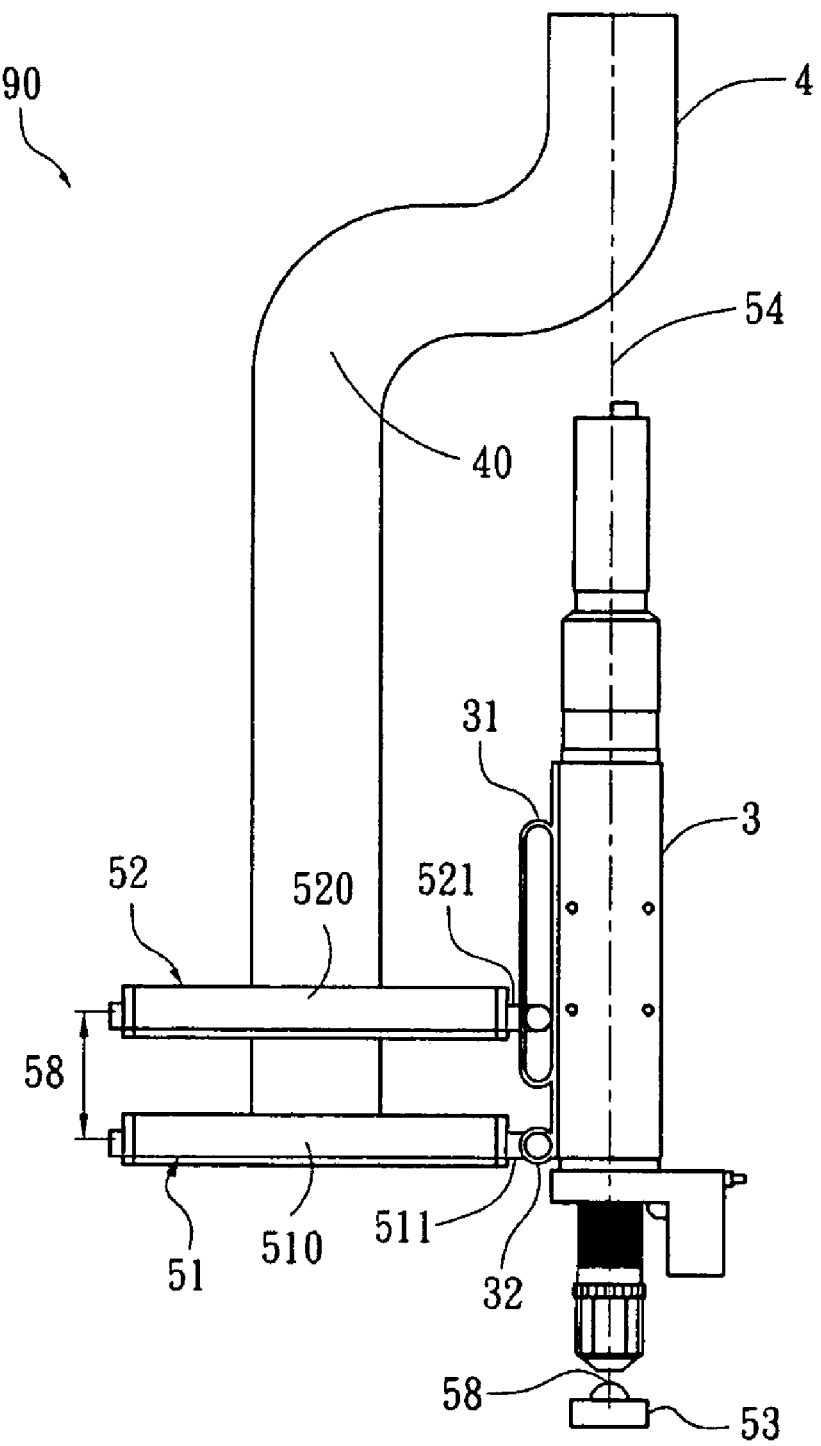
FIG. 11 is a structural diagram of the tilting adjustable surface profilometer in FIG. 8 for performing vertical detection.
Figure 12:
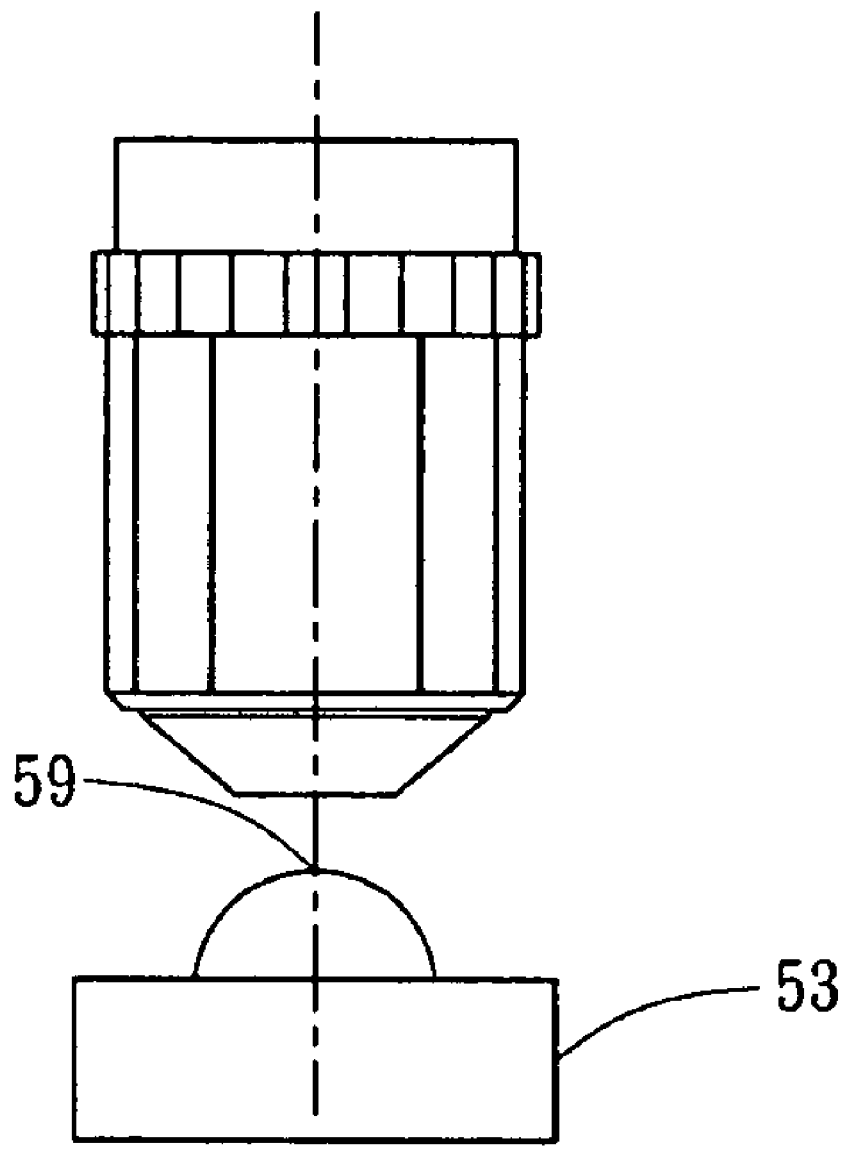
FIG. 12 is a schematic diagram showing the focal point of the surface detecting unit in FIG. 11, which is on the sample surface.
Figure 13:
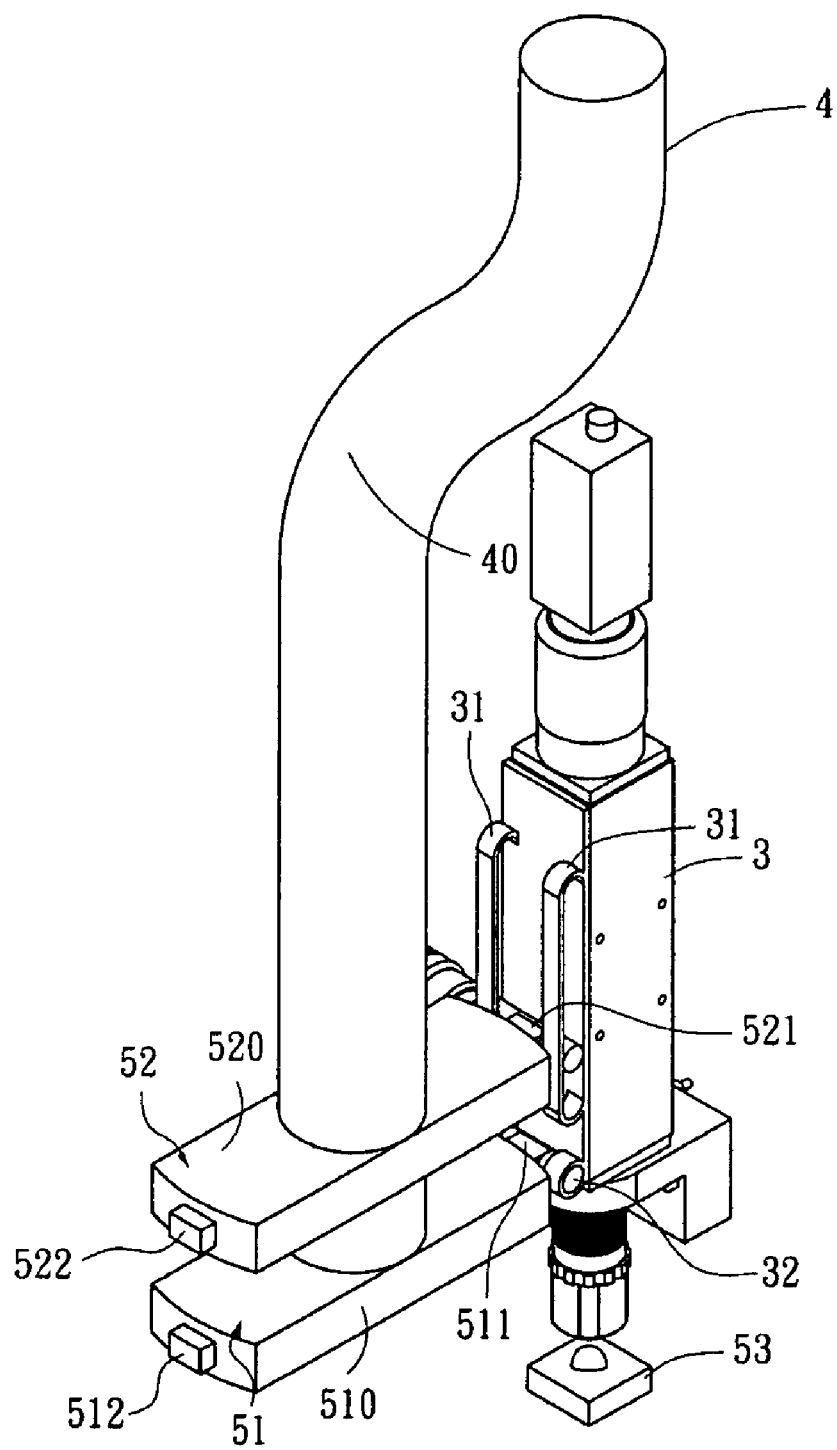
FIG. 13 is a 3-D structural diagram of the tilting adjustable surface profilometer in FIG. 10 for performing vertical detection.
Figure 14:
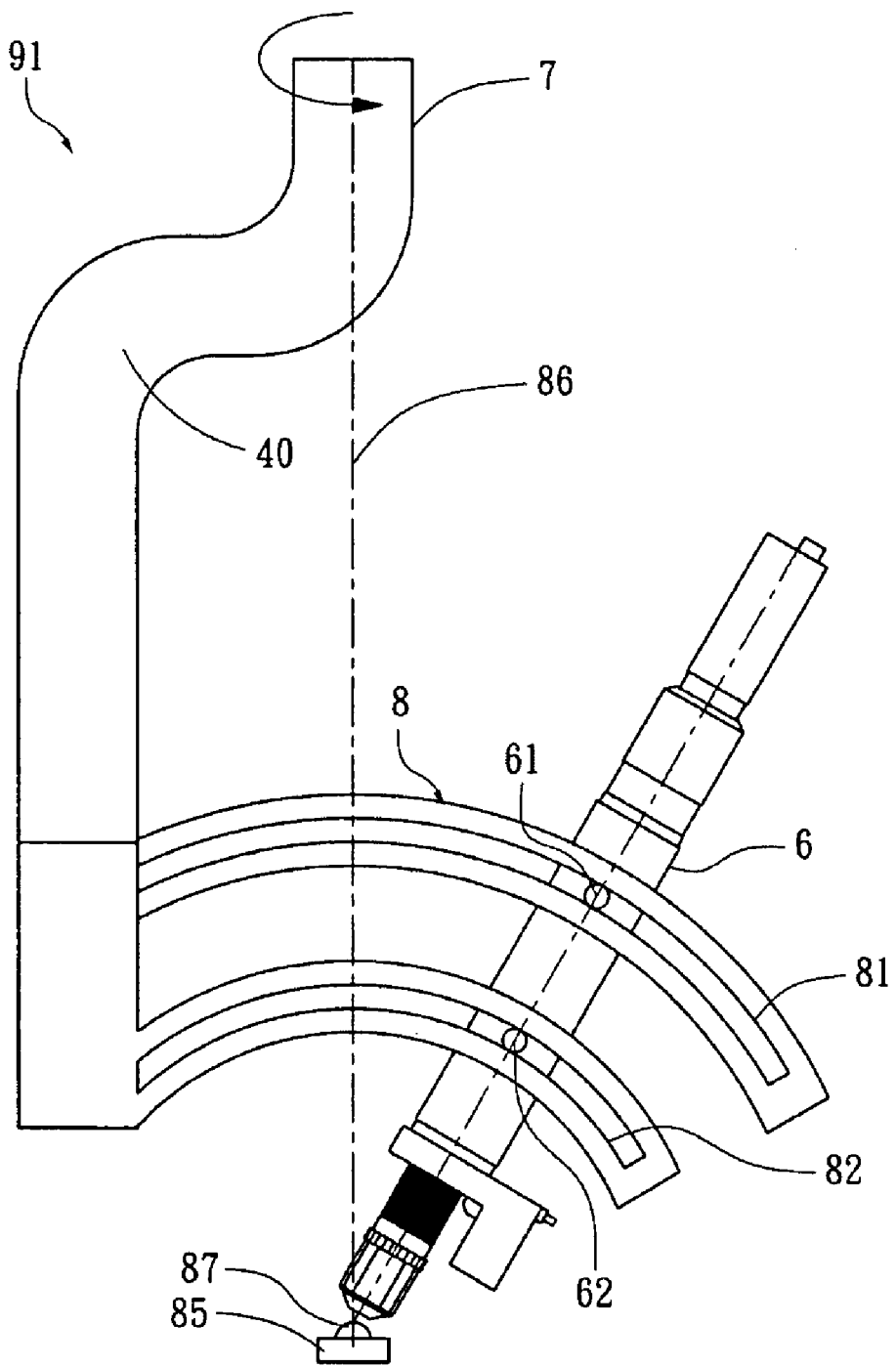
FIG. 14 is a schematic diagram showing a tilting adjustable surface profilometer according to a second embodiment of the present invention.
Figure 15:
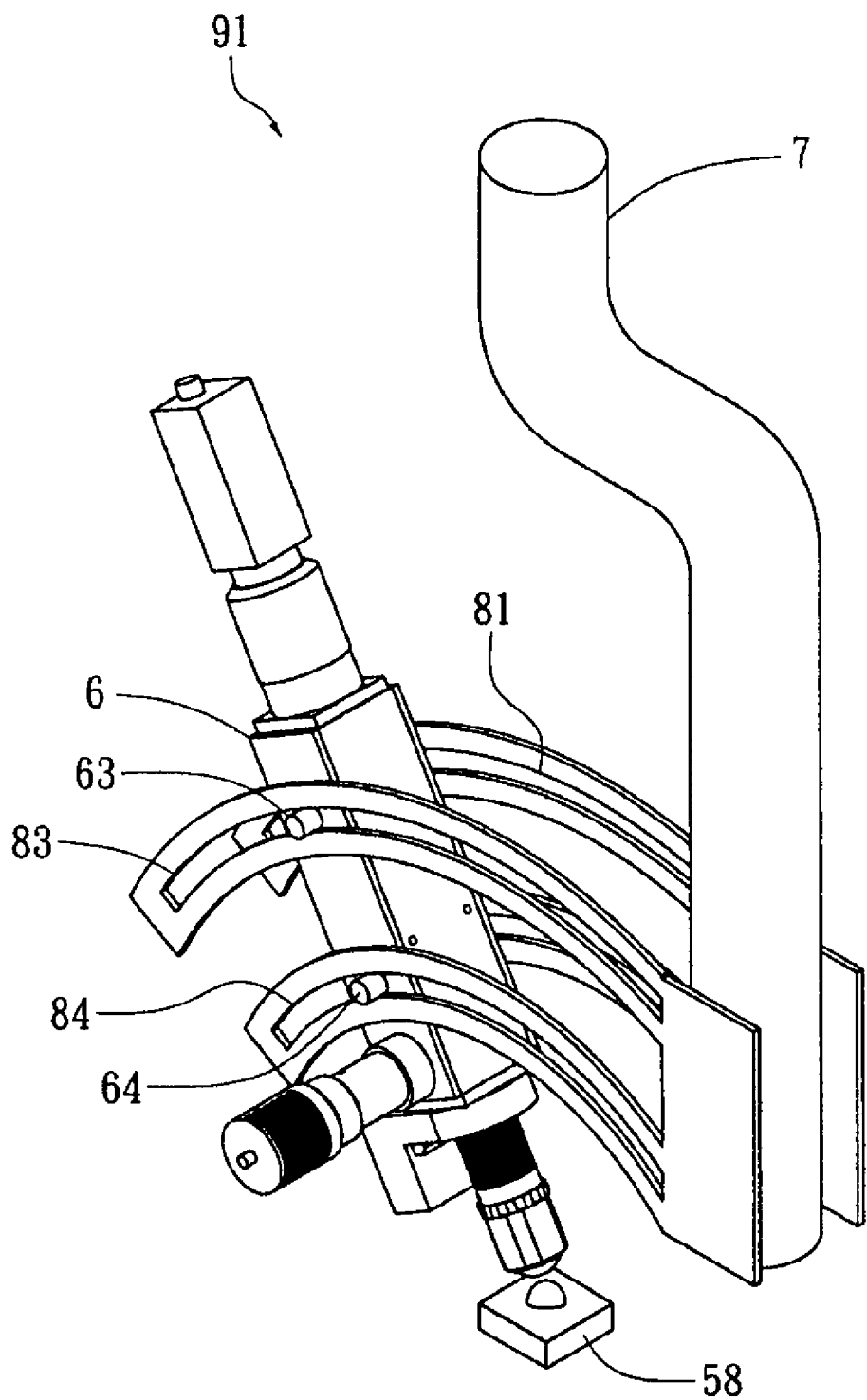
FIG. 15 is a 3-D structural diagram of the tilting adjustable surface profilometer in FIG. 14.
Figure 16:
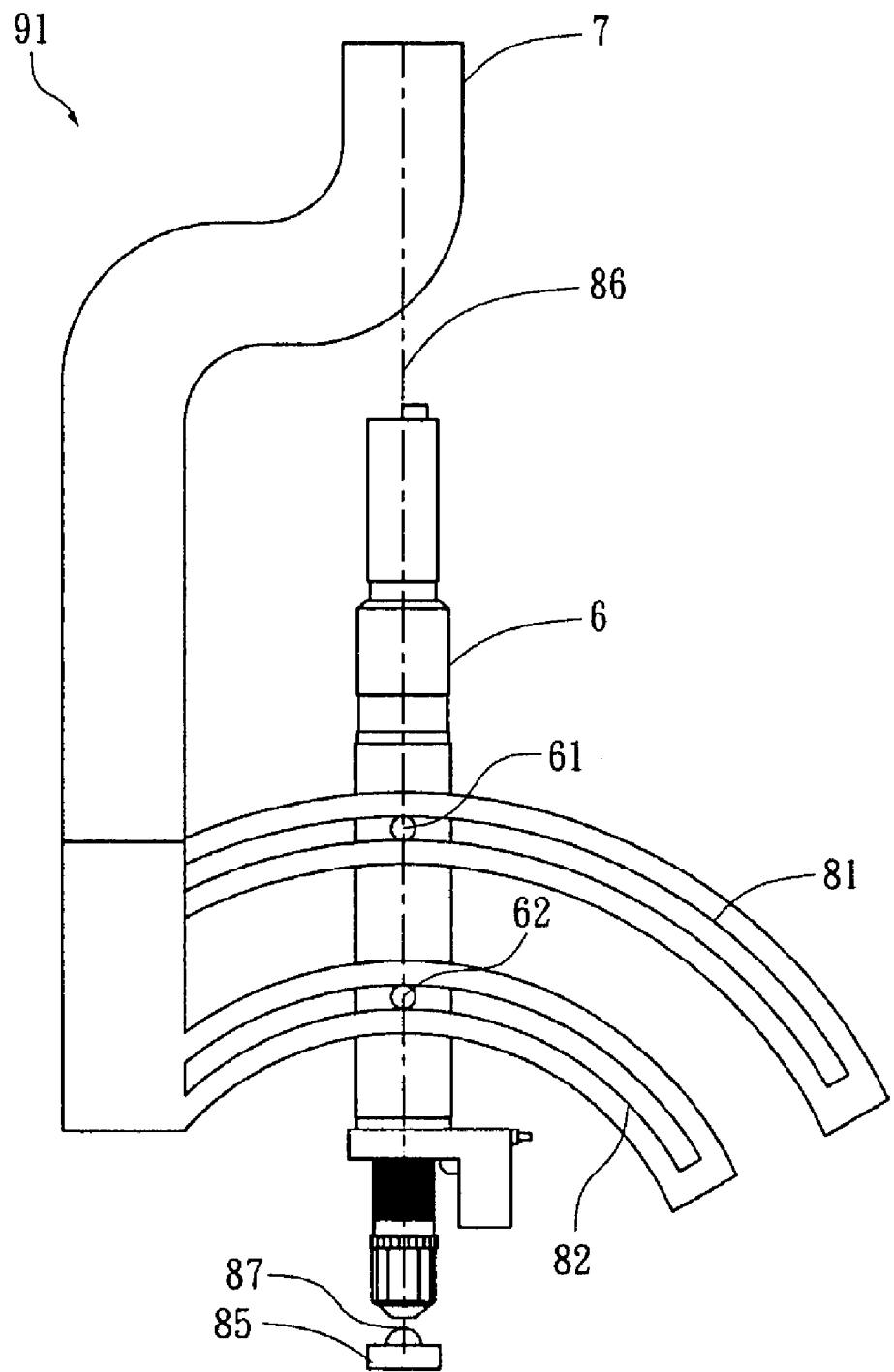
FIG. 16 is a structural diagram of the tilting adjustable surface profilometer in FIG. 14 for performing vertical detection.
Figure 17:
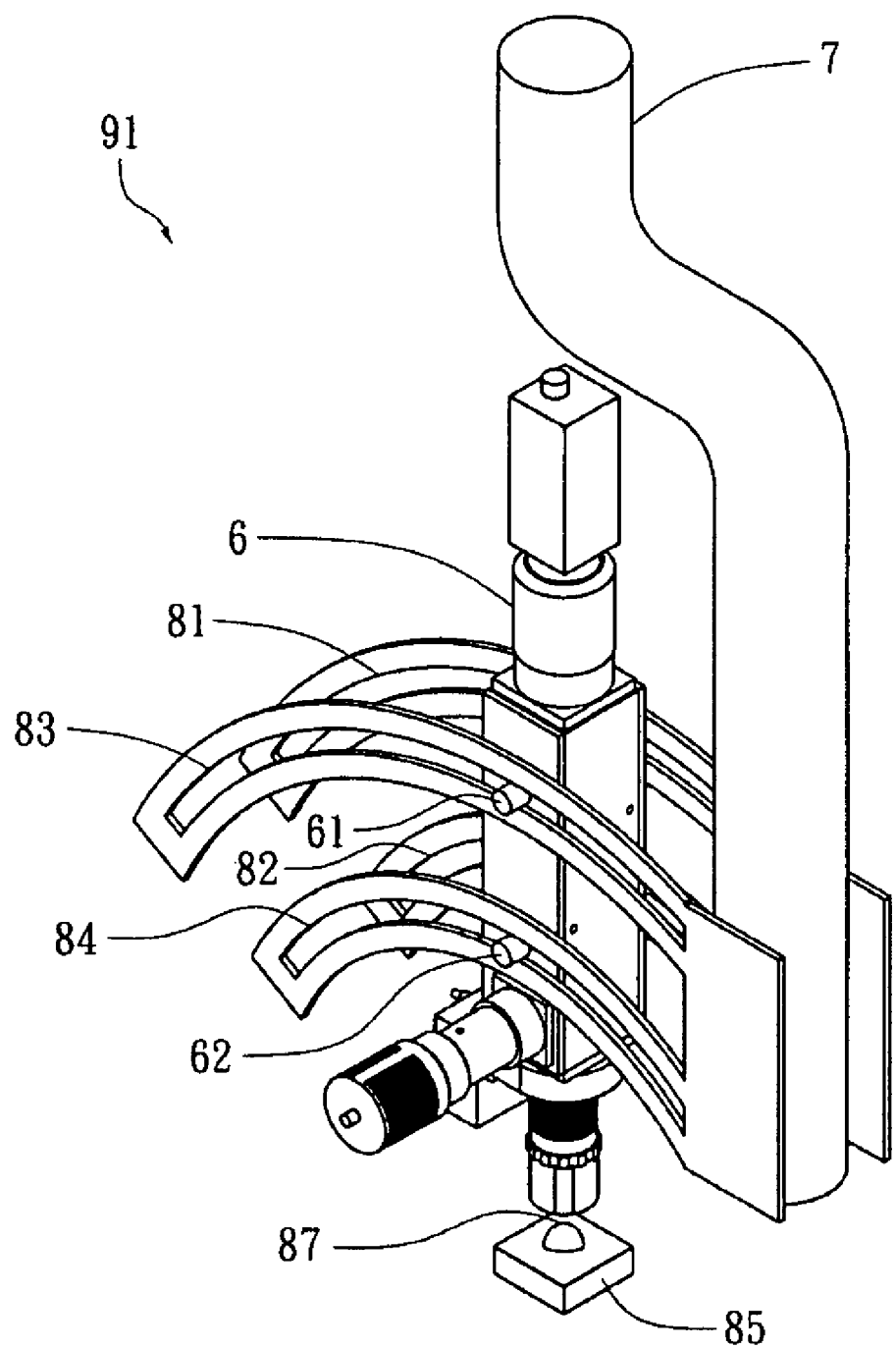
FIG. 17 is a 3-D structural diagram of the tilting adjustable surface profilometer in FIG. 15.

The present invention provides a tilting adjustable surface profilometer with an attempt to overcome the problems when detecting the surface profile of a sample with a large surface gradient. By using the disclosure of the present invention, the surface detecting unit can be tilt to any angle and rotate 360 degrees to obtain a surface profile with an omni-directional angle of a sample. Furthermore, software of image stitching can be used to re-construct the original surface profile of the sample. Therefore, the disclosure of the present invention will not be restricted by the volume of the sample and can be used for surface profilometry for a large micro-structured sample.

Moreover, the present invention is not only suitable for 3-D micro-structured surface profilometry, but also applicable to macro surface profilometry (for example, on aspheric surfaces).

The present invention provides a tilting adjustable surface profilometer capable of obtaining a surface profile with an omni-directional angle of a sample. The tilting adjustable surface profilometer includes two types of frameworks and can be exemplified by the preferred embodiments as described hereinafter.

First Embodiment

Please refer to FIG. 8 to FIG. 13. The tilting adjustable surface profilometer 90 comprises rotary rack 4, a surface detecting unit 3, a first tilting adjustment device 51 and a second tilting adjustment device 52. The surface detecting unit 3 is capable of acquiring a surface profile of a sample 53. In the present embodiment, the surface detecting unit 3 is an optical microscope, a scanning probe microscope or the like. The first tilting adjustment device 51 is coupled to the rotary rack 4 so that one end of the first tilting adjustment device 51 is fixedly coupled to the surface detecting unit 3. The first tilting adjustment device 51 comprises a first translation stage 511 and a first fixing base 510. The first translation stage 511 comprises a hinge 32 fixedly coupled to the surface detecting unit 3. However, the present invention is not restricted thereto. The hinge 32 can also be replaced by a sliding slot 31 and a hinge 32. With the hinge 32 and the first translation stage 511 fixedly coupled, the surface detecting unit 3 rotates around the hinge 32. The first fixing base 510 is coupled to the rotary rack 4.The first fixing base 510 comprises a traverse rail 512 disposed therein so that the first translation stage 511 is traversely movable on the traverse rail 512.

The second tilting adjustment device 52 comprises a sliding slot 31, a second translation stage 521 and a second fixing base 520. The sliding slot 31 is coupled to the surface detecting unit 3. One end of the second translation stage 521 is slidably coupled to sliding slot 31 so that the second translation stage 521 is capable of sliding in the sliding slot 31. The second fixing base 520 is coupled to the rack and is a height distant from the first fixing base 510. The second fixing base 520 comprises a traverse rail 522 disposed therein so that the second translation stage 521 is capable of traversely moving on the traverse rail 522. The traverse rail 522 is a linear traverse rail, linear motor or other precise linear moving device so as to precisely control the translation of the translation stage.

The operation of the tilting adjustable surface profilometer 90 is described hereinafter. The first translation stage 511 is capable of sliding on the traverse rail 512 on the first fixing base 510. The second translation stage 521 is capable of sliding on the traverse rail 522 on the second fixing base 520. As the tilting of the surface detecting unit 3 increases, the second translation stage 521 extends more out of the traverse rail 522 so that the position where the second translation stage 521 is slidably coupled to sliding slot 31 is above the sliding slot 31; on the contrary, as the tilting of the surface detecting unit 3 decreases, the second translation stage 521 extends less out of the traverse rail 512 so that the position where the second translation stage 521 is slidably coupled to sliding slot 31 is under the sliding slot 31.

Therefore, the rotary rack 4 of the tilting adjustable surface profilometer 90 is rotatable around the rotary axis 54 to drive the tilt or un-tilt surface detecting unit 3 to rotate. In the present embodiment, the rotary rack 4 comprises a twisted portion 40 so that there is no interference between the surface detecting unit 3 and the rotary rack 4 when the surface detecting unit 3 is performing detection within a tilting angle 55 close to zero. Moreover, those with ordinary skills in the art can easily think of the rotary rack 4 as a fixed rack without departing from the spirits of the present invention. The sample 53 is disposed at the focal point 59 of the surface detecting unit 3. Therefore, the surface profile with an omni-directional angle is acquired by the surface detecting unit 3. Furthermore, the sample 53 is applicable to a micro-structured brightness enhancement film in liquid crystal displays (LCD's) or a roller mold for manufacturing the brightness enhancement film.

As the rotary rack 4 rotates a fixed angle, the surface detecting unit 3 acquires a surface profile. The fixed angle depends on the field of view of the surface detecting unit 3. Basically, two overlapped surface profiles are required for image stitching to re-construct the sample. However, if the precision is as high as required for surface profile re-construction, overlapped surface profiles are not necessary.

The tilting angle 55 of the surface detecting unit 3 can be adjusted according to the translation distance 56 of the first translation stage 511 and the translation distance 57 of the second translation stage 521, as calculated as follows:

tilting angle 55=$\tan^{-1}$[(translation distance 56)−(translation distance 57)/distance 58 between first fixing base 510 and second fixing base 520]

Therefore, the tilting of the surface detecting unit can be adjusted according to the translation distance 57 of the first translation stage 511 and the translation distance 56 of the second translation stage 521. The rotary rack 4 can be moved upward, downward, left and right by a driving unit (not shown) to drive the surface detecting unit 3 coupled to the rotary rack 4 to move the same way. Meanwhile, the focal point 59 of the surface detecting unit 3 is kept positioned on the rotary axis 54 of the rotary rack 4 so as to maintain detection precision.

To make the size of the sample more flexible, the distance 58 between the first fixing base 51 and the second fixing base 52 can be adjusted to change the tilting angle 55 of the surface detecting unit 3 to achieve highest precision.

Second Embodiment

Please refer to FIG. 14 to FIG. 18. The tilting adjustable surface profilometer 91 comprises rotary rack 7, a surface detecting unit 6, and a tilting adjustment device 8. The surface detecting unit 6 is capable of acquiring a surface profile of a sample 85. The tilting adjustment device 8 is coupled to the rotary rack 7 so that the tilting adjustment device 8 is capable of driving the surface detecting unit to move with an arc-trajectory to adjust the tilting of the surface detecting unit. The tilting adjustment device comprises a plurality of arc rails and a plurality of slides. In the present embodiment, the plurality of slides comprises a first slide 61, a second slide 62, a third slide 63 and a fourth slide 64. The first slide 61 and the second slide 62 are disposed on the same side of the surface detecting unit 6, while the third slide 63 and the fourth slide 64 are disposed on the other side of the surface detecting unit 6. The first, the second, the third and the fourth slides (61, 62, 63, 64) are driven respectively to slide on the first, the second, the third and the fourth arc rails (81, 82, 83, 84). In the present embodiment, the slide is a cylindrical slide. The first, the second, the third and the fourth slides (61, 62, 63, 64) are well-known to those with ordinary skills in the art and descriptions thereof are not repeated.

The tilting adjustment device is fixed on the rotary rack 7 by using the first, the second, the third and the fourth slides (61, 62, 63, 64) to rotate with the rotary rack 7. The focal point 87 of the surface detecting unit 6 is located at the center of the first, the second, the third and the fourth arc rails (81, 82, 83, 84). Therefore, as the tilting of the surface detecting unit 6 changes, the focal point 87 of the surface detecting unit 6 is located at the same position on the sample 85 so as to maintain the detection precision. The rotary rack 7 is capable of rotating around the rotary axis 86. The rotary rack 7 is similar to the rotary rack 4 in the first embodiment, and therefore description thereof is not repeated.

Figure 18:
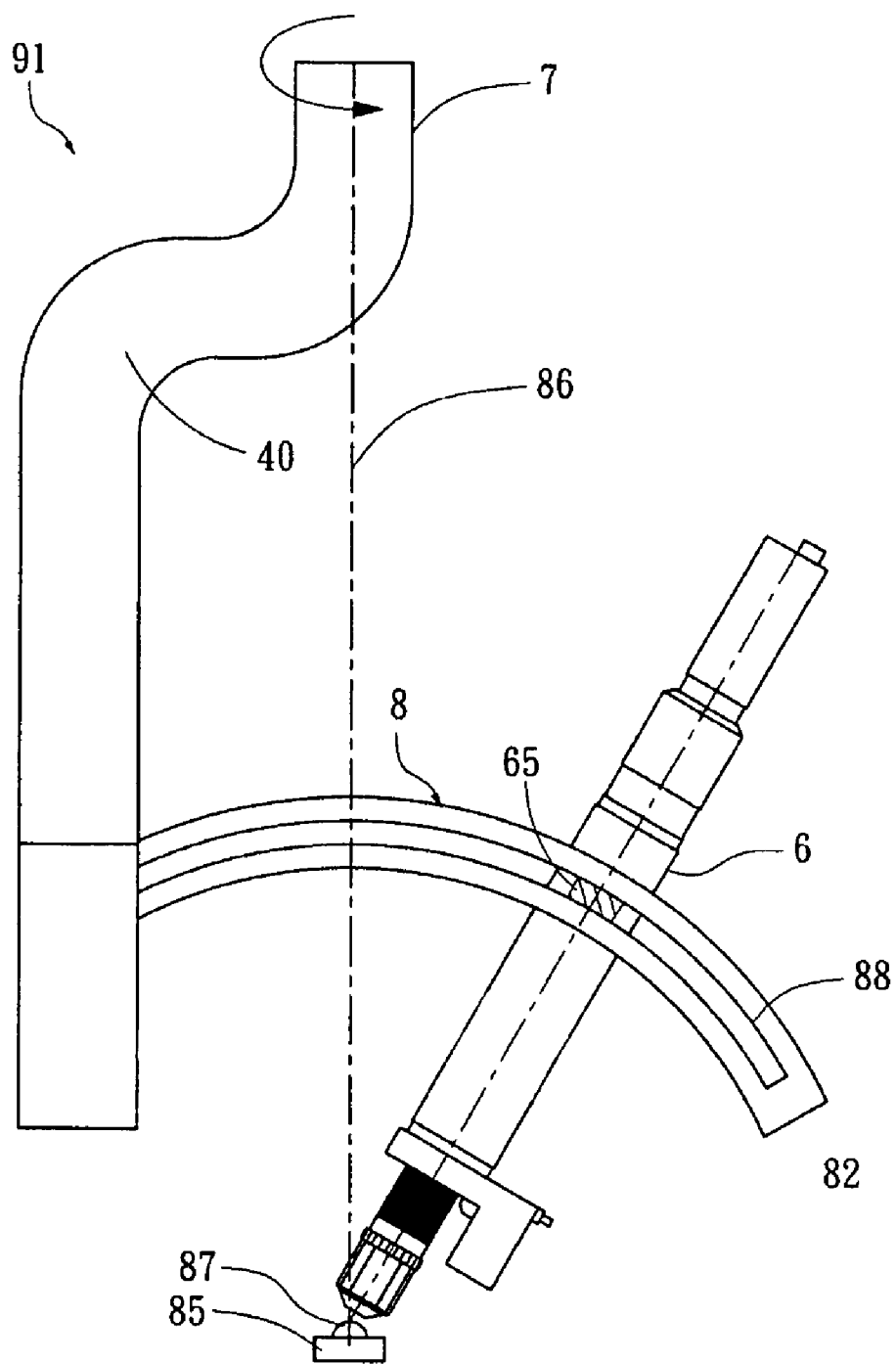
FIG. 18 is a modified example of a tilting adjustable surface profilometer in FIG. 14.

Moreover, the slides and arc rails can be disposed on one single side of the surface detecting unit 6. In other words, only the first, the second slides (61, 62) and the first, the second arc rails (81, 82) are used to achieve the same object. Alternatively, as shown in FIG. 18, only one slide 65 is disposed on one side of the surface detecting unit 6. In this example, the slide 65 is an arc sliding plate to match with an arc rail 88 of the tilting adjustment device. In this example, the tilting adjustment device is capable of fixing the surface detecting unit 6 and, therefore such an example is still within the scope of the present invention.

Similar to the first embodiment disclosed in FIG. 8 to FIG. 13, the rotary rack 7 of the second embodiment disclosed in FIG. 14 to FIG. 18 can be moved upward, downward, left and right by a driving unit (not shown) to drive the surface detecting unit 6 coupled to the rotary rack 7 to move the same way. Meanwhile, the focal point 87 of the surface detecting unit 6 is kept positioned on the surface of the sample 85.

From FIG. 8 to FIG. 18, it is understood that present invention provides a tilting adjustable surface profilometer with an attempt to overcome the problems when detecting the surface profile of a sample with a large surface gradient. By using the disclosure of the present invention, the surface detecting unit can be tilt to any angle and rotate 360 degrees to obtain a surface profile with an omni-directional angle of a sample. Furthermore, software of image stitching can be used to reconstruct the original surface profile of the sample. Therefore, the disclosure of the present invention will not be restricted by the volume of the sample and can be used for surface profilometry for a large micro-structured sample.

According to the above discussion, it is apparent that the present invention discloses a tilting adjustable surface profilometer capable of obtaining a surface profile with an omni-directional angle of a sample. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A tilting adjustable surface profilometer, comprising:
   a rack;
   a surface detecting unit, capable of acquiring a surface profile of a sample;
   a first tilting adjustment device, being coupled to the rack so that one end of the first tilting adjustment device is coupled to the surface detecting unit, wherein the first tilting adjustment device comprises a translation stage with one end being fixedly coupled to the surface detecting unit and a fixing base, being coupled to the rack, the fixing base comprising a traverse rail therein so that the translation stage is traversely movable on the traverse rail; and
   a second tilting adjustment device, being coupled to the rack and disposed on one side of the first tilting adjustment device so that one end of the second tilting adjustment device is slidably coupled to the surface detecting unit and the second tilting adjustment device and the first tilting adjustment device are capable of moving relatively to each other to adjust the tilting of the surface detecting unit, wherein the second tilting adjustment device comprises a sliding slot being coupled to the surface detecting unit, a translation stage with one end being slidably coupled to the sliding slot and a fixing base being coupled to the rack, the fixing base comprising a traverse rail therein so that the translation stage is traversely movable on the traverse rail.

2. The tilting adjustable surface profilometer as recited in claim 1, wherein the surface detecting unit is an optical microscope, a scanning probe microscope or the like.

3. The tilting adjustable surface profilometer as recited in claim 2, wherein the traverse rail is a linear traverse rail, linear motor or other precise linear moving device so as to precisely control the translation of the translation stage.

4. The tilting adjustable surface profilometer as recited in claim 3, wherein the traverse rail is a linear traverse rail, linear motor or other precise linear moving device so as to precisely control the translation of the translation stage.

5. The tilting adjustable surface profilometer as recited in claim 1, wherein the rack comprises a twisted portion and is rotatable so that the surface detecting unit is capable of performing 360 degree detection on the sample.

6. The tilting adjustable surface profilometer as recited in claim 1, wherein the sample is a micro-structured sample.

7. The tilting adjustable surface profilometer as recited in claim 6, wherein the micro-structured sample is applicable to a micro-structured brightness enhancement film in liquid crystal displays (LCDs) or a roller mold for manufacturing the brightness enhancement film.

8. A tilting adjustable surface profilometer, comprising:
   a rack;
   a surface detecting unit, capable of acquiring a surface profile of a sample; and
   a tilting adjustment device, being coupled to the rack so that the tilting adjustment device is capable of driving the surface detecting unit to move with a arc route to adjust the tilting of the surface detecting units;
   wherein the tilting adjustment device comprises at least an arc rail being fixedly disposed on one side of the rotary rack to adjust the tilting of the surface detecting unit and locate the focal point of an objective lens at one position while the surface detecting unit is kept tilt and at least a slide being fixedly disposed on one side of the surface detecting unit to drive the surface detecting unit to slide on the arc rail.

9. The tilting adjustable surface profilometer as recited in claim 8, wherein the surface detecting unit is an optical microscope, a scanning probe microscope or the like.

10. The tilting adjustable surface profilometer as recited in claim 9, wherein the slide is a cylindrical slide.

11. The tilting adjustable surface profilometer as recited in claim 9, wherein the slide is an arc sliding plate.

12. The tilting adjustable surface profilometer as recited in claim 8, wherein the sample is a micro-structured sample.

13. The tilting adjustable surface profilometer as recited in claim 12, wherein the micro-structured sample is applicable to a micro-structured brightness enhancement film in liquid crystal displays (LCD's) or a roller mold for manufacturing the brightness enhancement film.

14. The tilting adjustable surface profilometer as recited in claim 8, wherein the rack comprises a twisted portion and is rotatable so that the surface detecting unit is capable of performing 360 degree detection on the sample.

* * * * *